United States Patent
Sur et al.

(10) Patent No.: US 11,765,650 B2
(45) Date of Patent: Sep. 19, 2023

(54) TEMPORARY NETWORK OF EDGE COMPUTING DEVICES

(71) Applicant: salesforce.com, inc., San Francisco, CA (US)

(72) Inventors: Abhijit Sur, Highlands Ranch, CO (US); Rasmus Mencke, Copenhagen (DK)

(73) Assignee: Salesforce.com, Inc., San Francisco, CA (US)

(*) Notice: Subject to any disclaimer, the term of this patent is extended or adjusted under 35 U.S.C. 154(b) by 98 days.

(21) Appl. No.: 17/308,716

(22) Filed: May 5, 2021

(65) Prior Publication Data
US 2022/0361097 A1    Nov. 10, 2022

(51) Int. Cl.
| | | |
|---|---|---|
| *H04W 48/18* | (2009.01) | |
| *H04W 48/16* | (2009.01) | |
| *G06N 20/00* | (2019.01) | |
| *H04W 60/06* | (2009.01) | |
| *H04W 84/18* | (2009.01) | |
| *H04W 74/00* | (2009.01) | |
| *H04W 28/06* | (2009.01) | |

(52) U.S. Cl.
CPC ............ *H04W 48/18* (2013.01); *G06N 20/00* (2019.01); *H04W 28/06* (2013.01); *H04W 48/16* (2013.01); *H04W 60/06* (2013.01); *H04W 74/006* (2013.01); *H04W 84/18* (2013.01)

(58) Field of Classification Search
CPC ...... H04W 48/18; H04W 28/06; H04W 48/16; H04W 60/06; H04W 74/006; H04W 84/14; G06N 20/00
See application file for complete search history.

(56) References Cited

U.S. PATENT DOCUMENTS

| | | |
|---|---|---|
| 6,771,661 B1 * | 8/2004 | Chawla ............. H04L 47/823 370/468 |
| 8,560,575 B2 | 10/2013 | Gradin et al. |
| 8,892,573 B2 | 11/2014 | Gradin et al. |
| 9,832,273 B2 | 11/2017 | Mencke |
| 10,037,316 B2 | 7/2018 | Mencke et al. |
| 10,701,011 B2 | 6/2020 | Humphreys |
| 10,715,411 B1 * | 7/2020 | Jacob Da Silva .... H04L 67/566 |

(Continued)

*Primary Examiner* — Christopher M Crutchfield
*Assistant Examiner* — Tito Q Pham
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to temporary networks of edge computing devices. In some embodiments, an edge computing device manages, in response to occurrence of an event, a temporary network of edge computing devices. Managing the temporary network includes: forming the temporary network, managing membership of edge computing devices in the temporary network, causing the temporary network to perform a specified set of tasks, transmitting, to a remote server computing system, information associated with the specified set of tasks, and causing disbanding of the temporary network after determining that the specified set of tasks is complete. The disclosed techniques for managing temporary networks of edge computing devices may advantageously reduce the overall use of a network's bandwidth by reducing the amount of communication with a remote server system.

20 Claims, 7 Drawing Sheets

(56) References Cited

U.S. PATENT DOCUMENTS

| | | | |
|---|---|---|---|
| 10,795,743 | B2 | 10/2020 | Sur |
| 10,819,712 | B2 | 10/2020 | Cadden |
| 2001/0019554 | A1* | 9/2001 | Nomura ................. H04L 45/50 370/392 |
| 2016/0104067 | A1 | 4/2016 | Xu et al. |
| 2017/0289881 | A1* | 10/2017 | Kotecha ............... H04W 48/10 |
| 2018/0299864 | A1* | 10/2018 | Byers ..................... G06N 20/00 |
| 2019/0095054 | A1 | 3/2019 | Peng |
| 2019/0272282 | A1 | 9/2019 | Mencke |
| 2019/0327506 | A1* | 10/2019 | Zou .................... H04N 21/2223 |
| 2019/0394812 | A1* | 12/2019 | Kuo ........................ H04W 4/02 |
| 2020/0204430 | A1* | 6/2020 | Dawes ................. H04L 12/283 |
| 2021/0126840 | A1* | 4/2021 | Venkataramu ...... H04L 41/5019 |
| 2021/0174952 | A1* | 6/2021 | Leong .................... G16H 50/20 |
| 2021/0400568 | A1* | 12/2021 | Chaysinh ........... H04L 65/1016 |
| 2021/0406065 | A1* | 12/2021 | Liu ...................... G06K 9/6262 |
| 2021/0406088 | A1* | 12/2021 | Chen .................... G06F 9/5077 |
| 2022/0025611 | A1* | 1/2022 | Kandula ............... E02F 9/2054 |
| 2022/0052961 | A1* | 2/2022 | Chauhan .............. H04L 47/783 |
| 2022/0255790 | A1* | 8/2022 | Rui ......................... H04L 41/16 |
| 2022/0291954 | A1* | 9/2022 | Tezuka .................. G16Y 20/10 |

\* cited by examiner

TEMPORARY NETWORK OF EDGE COMPUTING DEVICES

BACKGROUND

Technical Field

This disclosure relates generally to wireless networks, and, more specifically, to techniques for creating and managing communities of devices in an ad hoc manner at the edge of wireless networks.

Description of the Related Art

Wireless networks often include large numbers of different types of connected devices. These devices are generally managed by a central server system that maintains a centralized data center or central cloud (e.g., the core of the wireless network). In some situations, these devices include internet of things (IoT) devices, such as sensors (e.g., cameras, microphones, lasers, etc.), speakers, cleaning devices, checkout devices, artificial intelligence (AI) devices, etc. Wireless networks including IoT devices are often deployed by enterprises, and managed by enterprise applications such as a customer relationship management (CRM) platform in order to provide on-demand services to various different entities (e.g., individual users, companies, etc.). The central cloud manages devices within a wireless network regardless of their location within the network by transmitting and receiving information from these devices, often resulting in a burden on the bandwidth of the wireless network.

DETAILED DESCRIPTION

Figure 1:
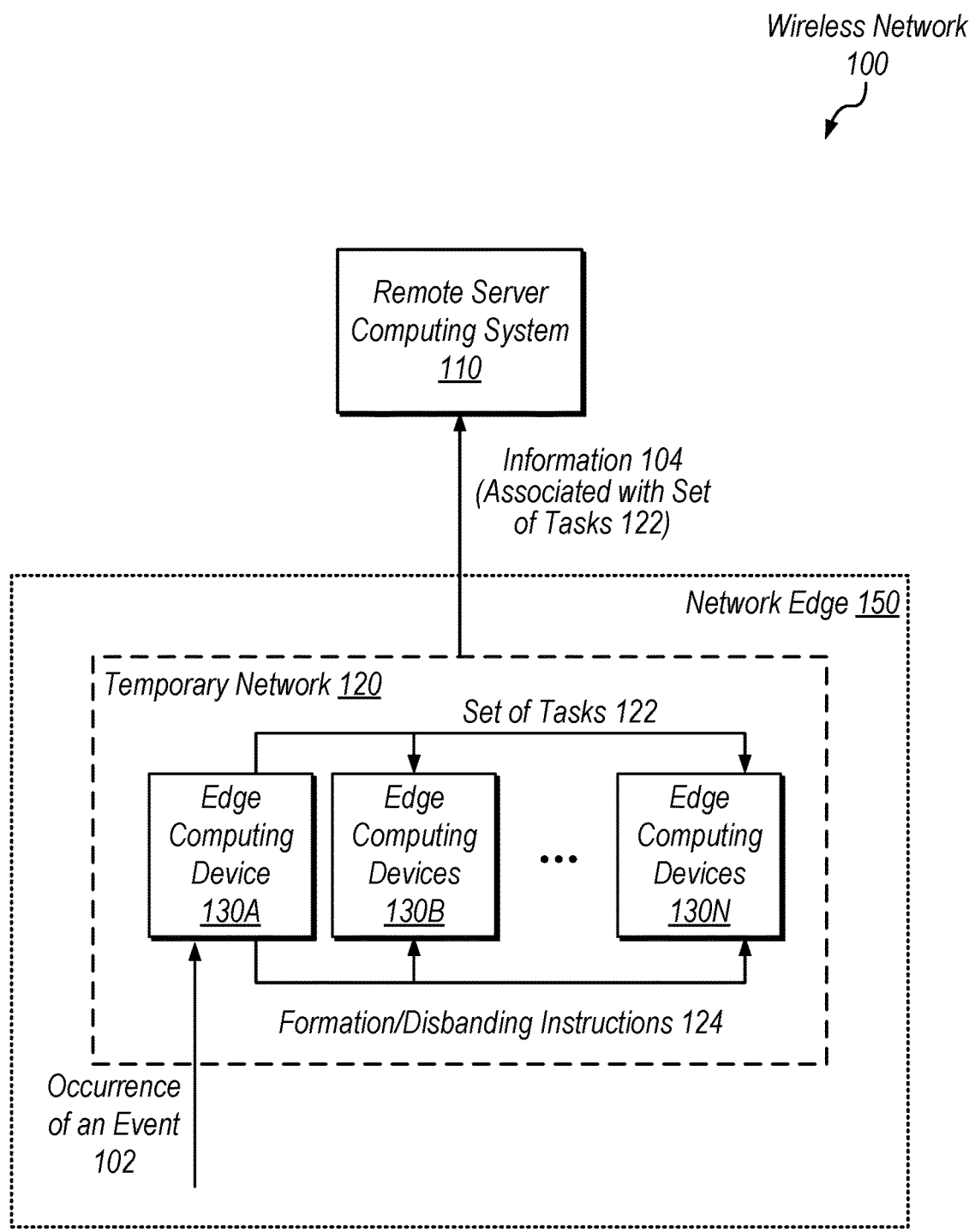
FIG. 1 is a block diagram illustrating an example wireless network, according to some embodiments.

Current network operations for monitoring and maintaining a wireless network of devices, such as IoT devices, is often performed by a central service. Such management, however, is not sufficient for massive machine-type communications (mMTC) involving e.g., millions of IoT devices. Further, problematic events occurring at the edge of a wireless network that IoT devices are attempting to solve may be complex and require input or assistance, or both from multiple types of devices. As such, the central service may operate at the threshold of its network bandwidth in order to communicate with devices at the network's edge to coordinate solving problems occurring at the edge.

As the number of Internet of Things (IoT) devices within various geographic regions (e.g., supply distribution centers, naval ports, sports venues, hospitals, etc.) increases, often exceeding a million devices per square mile, the need for more localized management of these devices increases, in order to avoid large exchanges of messages between the IoT devices at the edge of a network and a central cloud of the network (e.g., a server of the Salesforce CRM platform). Although such communication is relatively inexpensive, decentralizing communication between edge devices will advantageously prevent or reduce unnecessary use of the network's bandwidth, allowing such bandwidth to be used for other tasks. The disclosed techniques advantageously provide for computing and storage capabilities that are close to the source of data at the edge of wireless networks.

The present disclosure provides techniques for automatically creating, maintaining, and disbanding a community of devices at the edge of a wireless network. Devices at the edge of a network may collaborate to diagnose and solve problems within their network and then communicate with a central server to provide a summary of updates on such problems (e.g., after the devices in the community have taken care of the problem).

In order to avoid the frequent exchange of messages with a network's central server, the disclosed techniques provide for automatic configuration of a community of IoT devices at the edge of the network. Formation of a community of edge devices is automatically initiated by a single edge device in response to a triggering event within the network. The single edge device initiates connection with one or more other devices to form an edge device community to handle the event. The single edge device (or some other device in the formed community) becomes the community manager and organizes actions taken within the community as well as communication with the central server of the network (e.g., summarizing occurrences within the edge device community).

The disclosed techniques for decentralized formation and management of edge device communities may advantageously improve the efficiency of communication between devices in the community and a central server e.g., by providing for computing and storage capabilities close to the source of data at the edge of a wireless network. Further, the disclosed temporary formation of edge device communities advantageously promotes collaboration between multiple different types of devices at the edge of a network to solve complex problems more efficiently than if a central server were to manage the collaboration. For example, the temporary, as-needed formation of a community of devices improves network latency by reducing communications between edge devices and a remote server.

Temporary Network

FIG. 1 is a block diagram illustrating an example wireless network 100. In the illustrated embodiment, wireless network 100 includes remote server computing system 110, network edge 150, temporary network 120, which in turn includes a plurality of edge computing devices 130A-130N.

Edge computing device 130A, in the illustrated embodiment, receives a notification indicating the occurrence of an event 102 at network edge 150. In response to the event, edge computing device 130A forms and manages temporary network 120 by connecting to edge computing devices 130B-130N. Edge computing device 130A may form and manage temporary network 120 based on management instructions received from remote computing system 110. Such management instructions (e.g., artificial intelligence (AI) recommendations) are discussed in further detail below with reference to FIG. 3. For example, edge computing device 130A sends instructions 124 to edge computing devices 130 specifying to form connections. Edge computing device 130A may connect with one or more edge computing devices by: connecting with each of edge computing devices 130B-130N (e.g., a full mesh configuration), connecting with a device such as device 130B which in turn initiates a chain of connections with one or more of devices 130C-130N, sending instructions to a device such as device 130B to initiate connections with one or more other devices 130, sending instructions to each device 130 to connect with at least one other device within temporary network 120 (e.g., a partial mesh configuration), etc.

In some embodiments, edge computing device 130A connects to one or more other edge computing devices 130 using the 5G communication standard. For example, this type of communication is used to perform mMTC at industrial scale, e.g., via either private or public 5G networks. The disclosed communication may utilize various pre-defined 5G communication guidelines e.g., unicast, multicast, or broadcast or may determine and utilized a new customized set of 5G communication guidelines. In other embodiments, edge computing devices 130 connect using Wi-Fi, BLUETOOTH, ZIGBEE, cellular networks, near-field communication (NFC), radio-frequency identification (RFID), etc.

In some embodiments, edge computing device 130A is a manager device of temporary network 120. In other embodiments, edge computing device 130A detects the occurrence of an event 102 and then sends a notification to a second edge computing device 130 that becomes the manager device of temporary network 120. In still other embodiments, a device other than device 130A detects the occurrence of event 102 and sends a notification to device 130A. In this embodiment, device 130A either assumes the role of the managing device or transmits a notification to another edge computing device 130 which becomes the manager device.

Edge computing device 130A, in the illustrated embodiment, sends a set 122 of tasks to edge computing devices 130B-130N. Set 122 of tasks may include any of various tasks including one or more of the following: a role task (e.g., assume the role of manager device), a cleaning task (e.g., clean up a spill), a communication task (e.g., instruct another device to perform a task, send a notification to a central server with updates for the temporary network, etc.), a connection task (e.g., connect with another edge device), an access task (e.g., access pictures from another edge device), a security task (e.g., verify the identity of devices included in temporary network 120), a relocation task (e.g., relocate to where a spill occurred to assist in cleanup), and a media task (e.g., take a picture of a spill, take a picture once the task is complete, record ambient noise in the location of the event, etc.). In some embodiments, edge computing devices 130 send notifications to edge computing device 130A indicating whether they have completed one or more tasks in the set 122 of tasks assigned to them by device 130A. In some embodiments, devices 130 send notifications to edge computing device 130A indicating when they have formed connections or disbanded, or both.

Remote server computing system 110, in the illustrated embodiment, receives information 104 associated with the set 122 of tasks performed by the edge computing devices 130 included in temporary network 120. For example, this information may include updates about the temporary network 120, such as a type of event 102 that has occurred, an indication that the temporary network has been formed, a number of devices included in the temporary network, an indication that the temporary network has been disbanded, one or more types of devices included in the temporary network, etc. This information 104 may be sent via multiple different transmissions. For example, the indication that the temporary network has been formed may be sent at the time of formation, while some of the other updates may be sent at the time the temporary network 120 is disbanded. In some situations, information 104 may be sent periodically, as new information for the temporary network is available.

Remote server computing system 110 may be any of various types of server systems including a public cloud server, a private cloud server, a data center, etc. available over the internet, for example. In some embodiments, a plurality of temporary networks 120 are formed at different edges of wireless network 100. For example, multiple different autonomous temporary networks 120 are formed in response to separate occurrences of events and these networks communicate with remote server computing system 110, e.g., to inform the system of activities of the different temporary networks.

As used herein, the term "edge computing device" refers to a device that is operating within a wireless network and is located at an edge of the wireless network. For example, an edge computing device may be any of various types of devices including, but no limited to one or more of the following: a camera, a microphone, a mobile phone, a cleaning robot, a speaker, an automated teller machine (ATM), a checkout device, a tablet, a desktop computer, a motor vehicle, a wheelchair, connected appliances, home security systems, medical computing devices (e.g., wearable health monitors, biometric scanners, etc.), etc. As used herein, the term "network edge" refers to a geographic region in which a local network of computing devices interfacing with the Internet is located. For example, the edge of a network is an entry point for local devices to the Internet. A local network at the edge of a central network provides computation and data storage as close as possible to a local requesting device (e.g., reducing latency and improving bandwidth of the overall network).

As used herein, the term "temporary network" refers to a local community of connected devices that is formed on an as-needed basis within a wireless network. For example, the formation of temporary network 120 is triggered by the occurrence of some event 102. As used herein, the term "manager device" refers to a device that oversees formation, membership, and actions of a temporary network of computing devices. For example, this device performs actions traditionally performed by a central remote server of a larger network of devices within which the temporary network is located.

Example Temporary Network Rules

Figure 2:
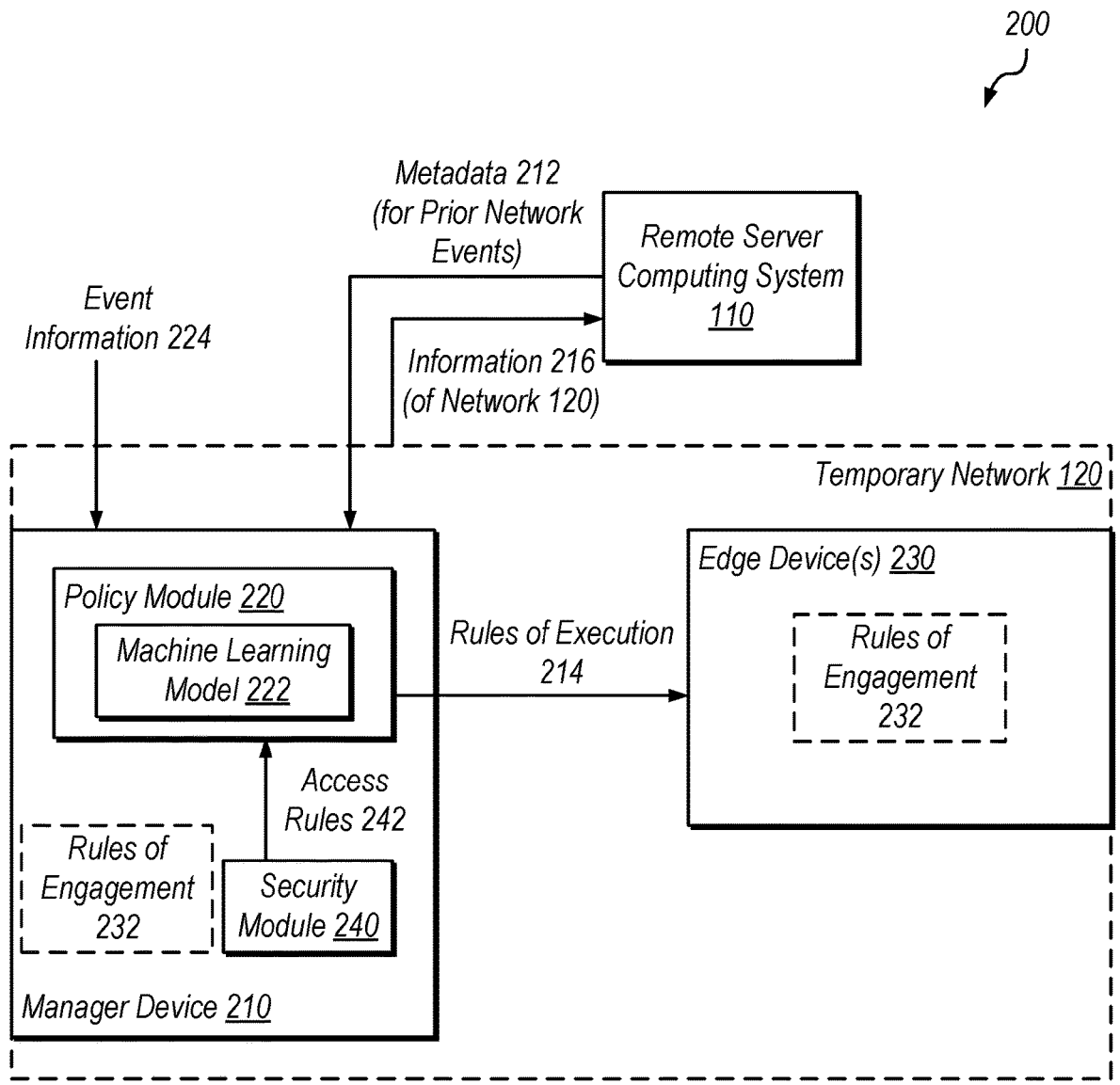
FIG. 2 is a block diagram illustrating example interaction between a platform and a network manager in response to occurrence of an event, according to some embodiments.

FIG. 2 is a block diagram illustrating example rules for a temporary network. In the illustrated embodiment, system 200 includes platform 202 and temporary network 120, which in turn includes manager device 210 and one or more edge devices 230. Note that manager devices 210 is one example of edge computing device 130A discussed above with reference to FIG. 1.

Manager device 210, in the illustrated embodiment, includes security module 240 and policy module 220, which in turn includes machine learning model 222. In some embodiments, manager device 210 includes rules of engagement 232. In some situations, the rules of engagement 232 may be predownloaded on manager device 210 from remote server computing system 110 prior to the occurrence of an event. In other situations, the rules of engagement 232 are downloaded by manager device 210 from platform 202 in response to receiving event information 224 (i.e., based on the occurrence of an event). Rules of engagement 232 specify when to set up and tear down a community of devices at the networks edge (e.g., temporary network 120). In some embodiments, rules of engagement 232 specify eligibility criteria for which devices are allowed to become members of a temporary network.

Manager device 210, in the illustrated embodiment, receives event information 224 (e.g., sensor data associated with an event) and prior data 212 (e.g., multimedia) for prior network events from platform 202. In some embodiments, manager device 210 downloads security module 240 from platform 202 based on the occurrence of an event. In other embodiments, security module 240 is predownloaded onto manager device 210 from remote server computing system 110 prior to the occurrence of an event.

Security module 240, in the illustrated embodiment, evaluates various edge device(s) 230 included in temporary network 120 and provides access rules 242 for ones of the devices 230. These access rules 242 specify which devices 230 have read and write access to data (e.g., images, audio, etc.) e.g., obtained within temporary network 120. For example, manager device 210 may have access rules 242 specifying that it is allowed to read and write from any edge device(s) 230 included in network 120. A first edge device 230, however, may have access rules 242 specifying that it only has access to data obtained by a second, different edge device 230 and does not have access to data obtained by other devices 230 in network 120. In various situations, the access rules 242 specify what type of data (e.g., images, audio, video, text files, etc.) devices within the temporary network are allowed to communicate to other devices in the network.

Policy module 220 trains a machine learning model 222 based on event information 224, prior data 212, rules of engagement 232, and access rules 242. For example, policy module 220 is operable to train a machine learning module based on various policies of remote server computing system 110. The trained machine learning model may then be used to determine particular rules of execution 214 for the temporary network 120. As such, the rules of execution 214 are metadata driven based on characteristics of the temporary network 120 (e.g., how many people are present in a mall when a coffee drink is spill). For example, artificial intelligence recommendations output by the trained model may be obtained by temporary network 120 by analyzing various multimedia available within the network 120.

As one specific example, when the occurrence of an anomalous event is detected within network 120 based on event information 224, prior data 212, rules of engagement 232, and access rules 242, the trained machine learning model may provide recommendations on how this anomalous event might be handled as well as which types of devices should be added to the community. In this specific example, if a device has been used for a similar task before (e.g., cleaning up a spill), then the model may recommend adding this or a similar device to the temporary network 120 based on this device participating in a similar task for a previous event. In various situations, the rules of engagement 232 specify timing information for the set 122 of tasks to be performed by temporary network 120. For example, the rules of engagement 232 might specify that a coffee spill needs to be cleaned up within five minutes of detection.

In some embodiments, manager device 210 downloads hard-coded rules of execution 214 from remote server computing system 110 based on the occurrence of an event. In this scenario, manager device 210 sends various information 216 associated with temporary network 120 to remote server computing system 110. In response, remote server computing system 110 sends rules of execution 214 to device 210 based on evaluating the information associated with the current temporary network 120 and information associated with various prior temporary networks. In this scenario, remote server computing system 110 may perform the operations performed by policy module 220 in the embodiment discussed in the paragraph above (i.e., training and execution of a machine learning model 222).

Example Network Manager

Figure 3:
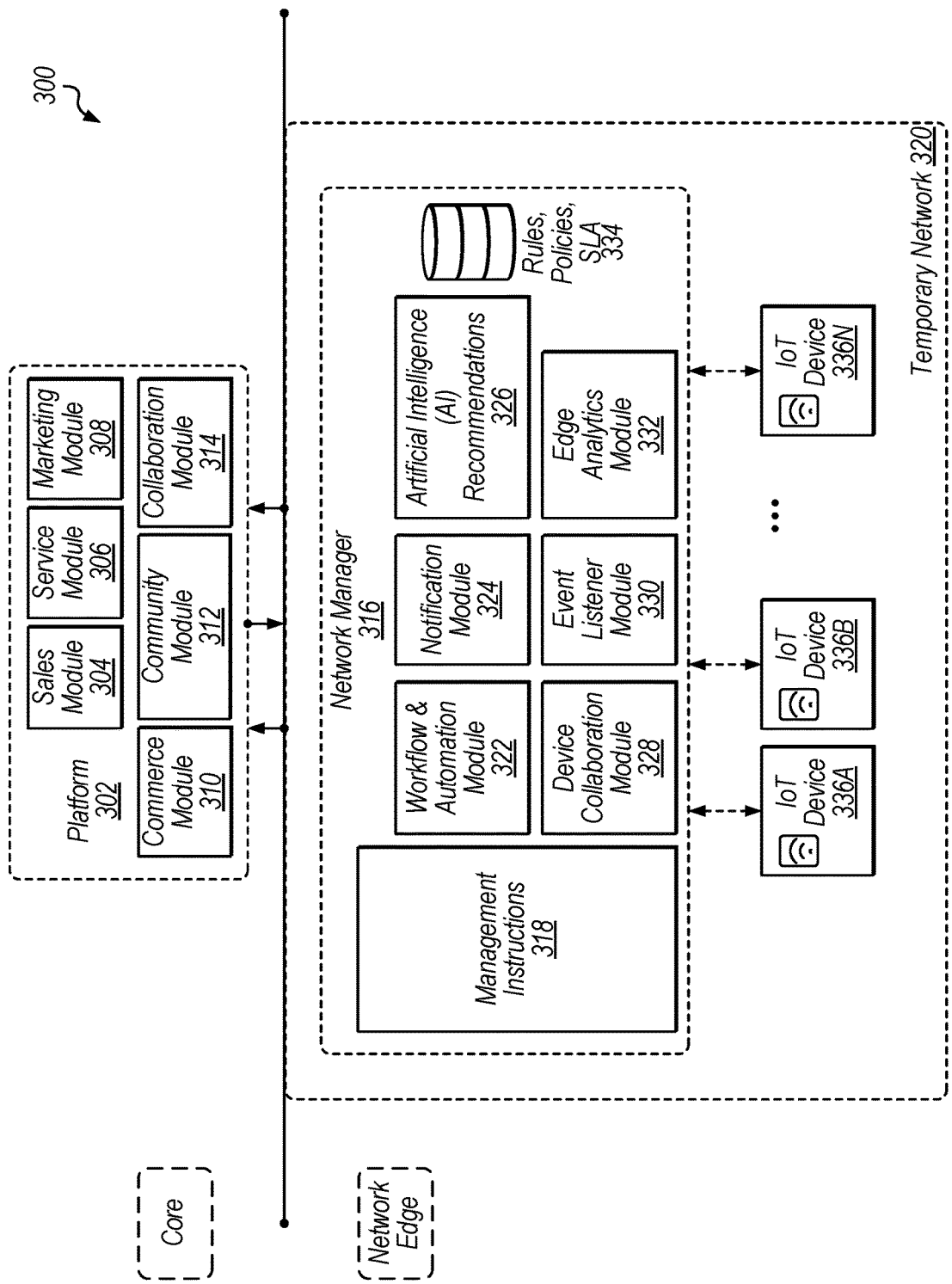
FIG. 3 is a block diagram illustrating example rules for a temporary network, according to some embodiments.

FIG. 3 is a block diagram illustrating example interaction between a platform and a network manager in response to occurrence of an event. In the illustrated embodiment, network 300, one example of wireless network 100 discussed above with reference to FIG. 1, includes platform 302 at its core, and network manager 316 and Internet of things (IoT) devices 336A-336N connected as part of a temporary network 320 at the network edge. Note that platform 302 may be included in and executed by remote server computing system 110 discussed above with reference to FIG. 1. Network manager 316 is one example of the edge computing device 130A shown in FIG. 1.

Platform 302 includes a sales module 304, a service module 306, a marketing module 308, a commerce module 310, a community module 312, and a collaboration module 314. In some embodiments, platform 302 is a customer-relationship management (CRM) platform that provides various online services to different entities. For example, platform 302 may provide, via modules 303-314, for online management of sales, marketing, commerce, collaboration with other businesses, etc. for a given business. Various other types of modules may be included in platform 302 based on different needs of the network 300. For example, platform 302 may also include a parts distribution module in the context of a manufacturing plant or an aisle solution module for a merchant's physical store. As shown in the illustrated embodiment, platform 302 resides at the "core" of the wireless network. That is, platform 302 may be a centralized server that remotely communicates with various communities of devices at its "network edge," such as the temporary network formed by network manager 316 with various IoT devices 336 at the network's edge.

As used herein, the term "platform" refers to an environment that includes a set of resources that enables some functionality. (For example, in the context of the present disclosure, the functionality is management of temporary networks). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules," discussed below, are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, a customer-relationship management (CRM) platform according to the present disclosure provides resources for performing various online tasks for different entities. These entities may utilize the platform in order to manage problems at the edge of a network within which the platform operates, for example.

In this disclosure, various "modules" operable to perform designated functions are shown in the figures and described in detail above (e.g., notification module 324, edge analytics module 332, device collaboration module 328, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Network manager 316, in the illustrated embodiment, includes management instructions 318, a workflow and automation module 322, notification module 324, artificial intelligence (AI) recommendations 326, a device collaboration module 328, an event listener module 330, an edge analytics module 332, and rules, policies, and service-level agreements (SLA) 334. In the illustrated embodiment, network manager 316 communicates with a plurality of IoT devices 336A-336N in response to the occurrence of an event (not shown) at the network edge.

Management instructions 318 specify when to establish and tear down a temporary network (e.g., temporary network 320), when to add and remove IoT devices 336 from the temporary network, as well as how to monitor activity within the temporary network. Workflow and automation module 322 determines, based on metadata of the temporary network, the set 122 of tasks that the temporary network should perform, including the order in which the tasks should be performed. Notification module 324 provides updates to platform 302 indicating activities of the temporary network formed by network manager 316. Device collaboration module 328 determines which metadata of the temporary network should be shared with which IoT devices 336. For example, module 328 determines which devices 336 to share multimedia with.

AI recommendations 326 include instructions generated by an AI model (executed by either platform 302 or network manager 316) indicating various tasks that should be performed by IoT devices 336 for the temporary network. For example, network manager 316 may generate AI recommendations 326 based on rules, policies, and SLA's 334 received from platform 302. Event listener module 330 listens for events occurring within network 300. Based on event listener module 330 "hearing" an event, network manager 316 may form a temporary network that includes one or more of IoT devices 336. Edge analytics module 332 observes occurrences at the edge of network 300 and analyzes these occurrences. Based on observations and analytics from edge analytics module, an AI model provides AI recommendations 326. For example, AI recommendations may indicate that a temporary network should be formed or that some action should be taken by the temporary network to solve a problem at the network's edge. AI recommendations 326 may also recommend a device that is best-suited to respond to a problem at the network's edge e.g., based on the amount of power left in the device's battery, a device's range of movement, geographic location, etc. Edge analytics module 332 may also perform customer behavior analyses, monitor energy operations of various edge computing devices, etc.

Example Network Event

Figure 4:
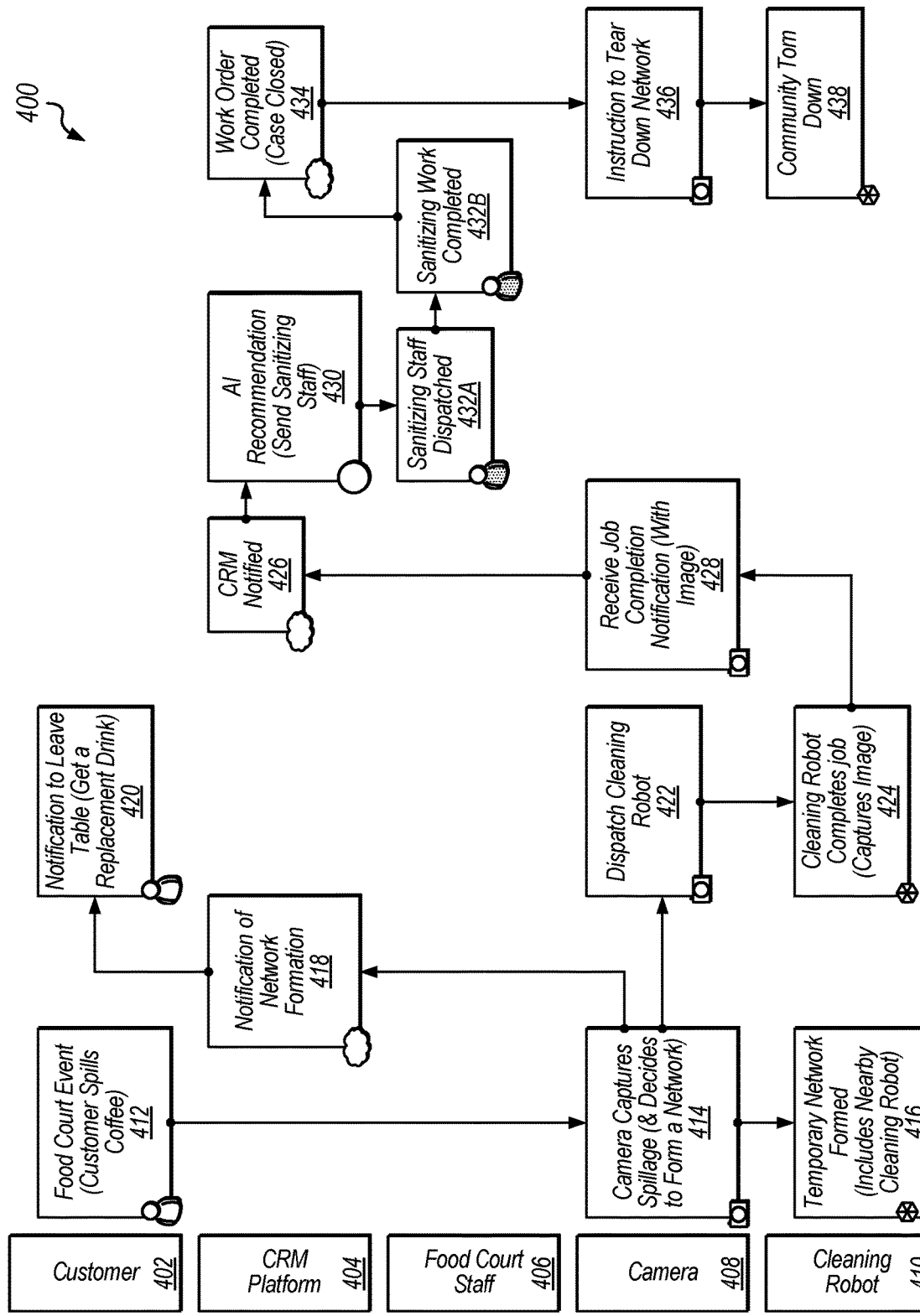
FIG. 4 is a block diagram illustrating management of an example network event, according to some embodiments.

FIG. 4 is a block diagram illustrating an example network event. In the illustrated embodiment, example 400 includes a customer 402, a customer relationship management (CRM) platform 404, food court staff 406, a camera 408, and a cleaning robot 410.

In the illustrated embodiment, various actions are shown on a timeline from left to right within FIG. 4. For example, a customer 402 spills coffee in a food court, which is shown as food court event 412. This event triggers a camera 408 (one example of edge computing device 130A) to capture the spillage (e.g., via an image or a video) at 414. Based on this image, camera 408 forms a temporary network with a nearby cleaning robot 410 (one example of edge computing device 130B) at 416. The camera 408 then sends a notification 418 to CRM platform 404 indicating that a temporary network has been formed.

In the illustrated embodiment, based on notification 418, CRM platform 404 sends a notification 420 to customer 402 (e.g., via a flat screen TV display in the food court or may send a direct message to the customer on his or her mobile application in situations where the customer is authenticated with CRM platform 404) to leave the table and go get a replacement drink. At the same time, camera 408 sends a dispatch instruction 422 to the cleaning robot 410 to go clean up the spill. The cleaning robot 410 completes the cleaning job 424 and captures an image of the clean floor. The camera 408 receives a job completion notification 428 that includes the captured image from the cleaning robot 410. The camera 408 then sends a notification 426 to the CRM platform 404 indicating that the job is complete.

CRM platform 404 executes an AI model to generate AI recommendation 430. The CRM platform 404 sends instructions to sanitizing staff at 432A, dispatching them to sanitize the area where the customer 402 spilled their coffee. Once the sanitizing work is complete at 432B, the sanitizing staff send a completed work order at 434 to the CRM platform 404. The CRM platform then sends instructions 436 to the camera 408 to tear down the temporary network. Camera 408 cuts communication with cleaning robot 410 and the community is successfully torn down at 438. When camera 408 cuts communication with cleaning robot 410, this marks the status of cleaning robot 410 as available.

Example Methods

Figure 5:
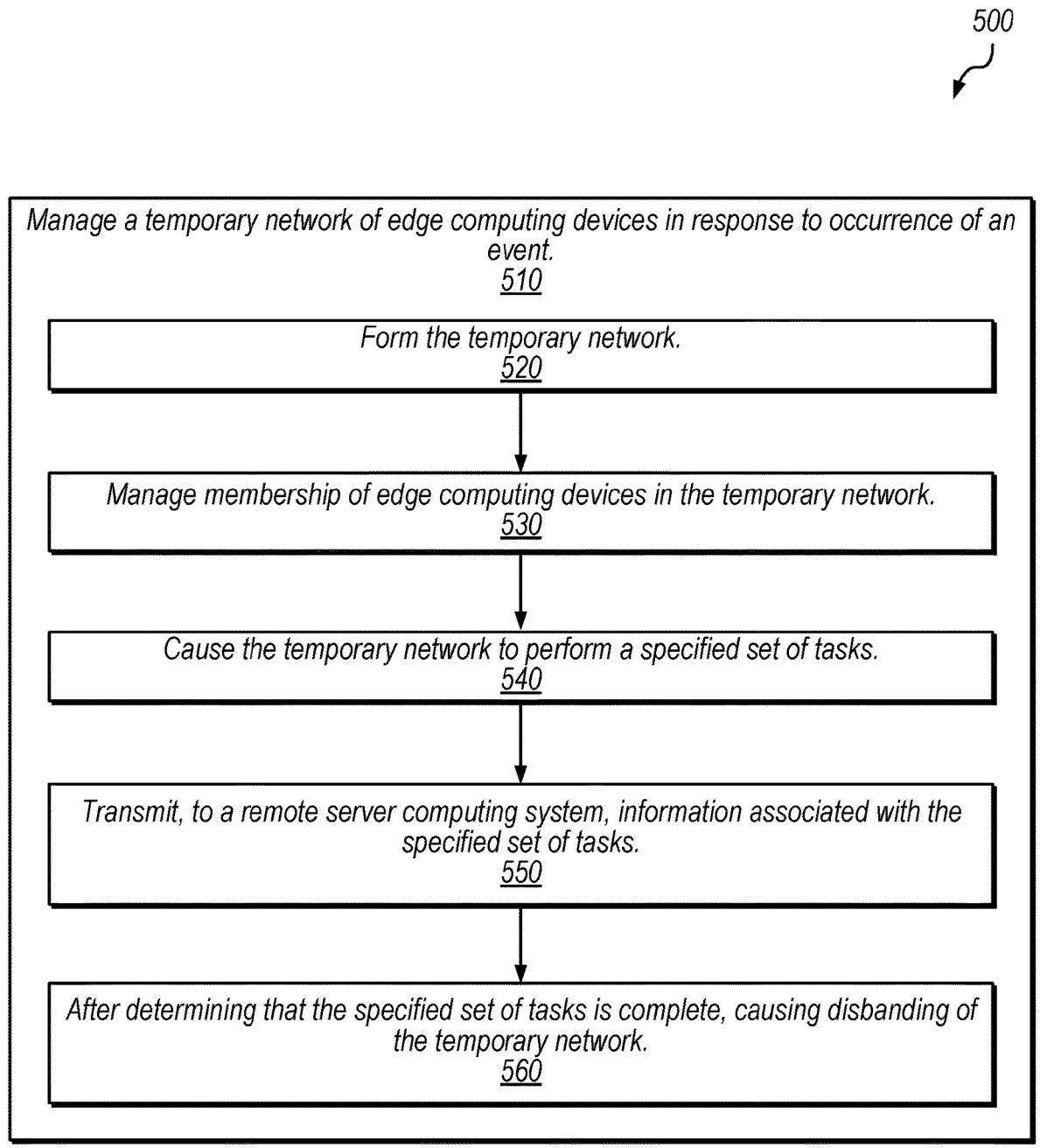
FIG. 5 is a flow diagram illustrating a method for managing a temporary network of edge computing devices, according to some embodiments.

FIG. 5 is a flow diagram illustrating a method for managing a temporary network of edge computing devices, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 500 may be performed by one of edge computing devices 130, for example.

At 510, in the illustrated embodiment, an edge computing device manages a temporary network of computing devices in response to occurrence of an event. In some embodiments, the edge computing device is a manager device of the temporary network. In some embodiments, prior to managing the temporary network, the edge computing device receives an indication of the occurrence of the event from another edge computing device. For example, the another device may be a camera that detects a coffee spill (i.e., an event) in a cafeteria and this camera sends a notification of this spill to the manager device, which then forms and manages a temporary network of edge devices to clean up the spill. In this example, the camera may be added to the temporary network by the manager device in order to take pictures of the area where the spill occurred (e.g., to determine when the temporary network of devices has finished cleaning up the spill).

At 520, the edge computing device forms a temporary network. For example, the edge computing device may cause one or more other edge computing devices to connect to form a network of devices. In some embodiments, these devices are located in the same geographic location. In some embodiments, the edge computing device managing the temporary network and a first edge computing device included in the temporary network are located within a first geographic region and a second edge computing device included in the temporary network is located within a second, different geographic region. In some embodiments, edge computing devices included in the temporary network are connected in a full mesh configuration. For example, a full mesh configuration means that each device within a temporary network is connected to each other device in the temporary network.

At 530, the edge computing device manages membership of edge computing devices in the temporary network. In some embodiments, the edge computing device prevents one or more devices from connecting to the temporary network based on security rules. For example, a remote server computing system may communicate with the edge computing device to instruct it not to allow certain devices to join the temporary network, e.g., based on these devices being malicious or unverified, or both. In this way, unknown devices will be unable to access data within the temporary network and will be unable to interfere with the operations of the network. In some embodiments, the remote server computing system includes and executes a customer-relationship management platform.

In some embodiments, the managing is performed based on a set of engagement rules that are downloaded by one or more edge computing devices from the remote server computing system prior to the occurrence of the event, where the set of engagement rules specify guidelines for forming and disbanding temporary networks. For example, the rules of engagement may specify which devices are allowed to be added to the temporary network e.g., for security reasons.

In some embodiments, the managing is performed based on a set of execution rules, where the set of execution rules are downloaded, by the edge computing device managing the temporary network from a remote server computing system, in response to the occurrence of the event. In some embodiments, the set of execution rules are determined by the remote server computing system based on metadata associated with the temporary network. For example, the rules of execution are driven by metadata of a temporary network. The server computer system is included in a wireless network within which the temporary network is formed. This server computer system provides the manager device rules that are specific to the particular event for which the temporary network was formed. The rules may also be based on the types and number of devices included in the temporary network. In some embodiments, the set of execution rules includes one or more of the following rules: data access privileges for one or more edge computing devices, tasks executable by respective types of edge computing devices, and time requirements for responding to the event.

At 540, the edge computing device causes the temporary network to perform a specified set of tasks. In some embodiments, the set of tasks is specified by the edge computing device implementing the managing based on evaluating the event and available edge computing devices using a trained machine learning model. In some embodiments, evaluating the event and available edge computing devices includes implementing a machine learning model trained on rules, policies, service-level agreements (SLAs), etc. to determine which tasks the temporary community should perform.

At 550, the edge computing device transmits, to a remote server computing system, information associated with the specified set of tasks. In some embodiments, the information associated with the set of tasks specifies one or more of the following: a type of event that has occurred, an indication that the temporary network has been formed, a number of devices included in the temporary network, an indication that the temporary network has been disbanded, and one or more types of devices included in the temporary network. For example, the information may include updates on occurrences within the temporary network for the remote central server.

At 560, the edge computing device causes disbanding of the temporary network after determining that the specified set of tasks is complete. For example, the edge computing device may transmit an instruction to each device in the temporary network to disconnect from the other devices in the temporary network. After sending this instruction, the edge computing device may verify that the other devices are indeed no longer connection. The edge computing device may also send an update to the central server system indicating that the temporary network has been disbanded and is no longer functioning and that the devices that were previously included in this temporary network are now available to assist in other tasks.

Figure 6:
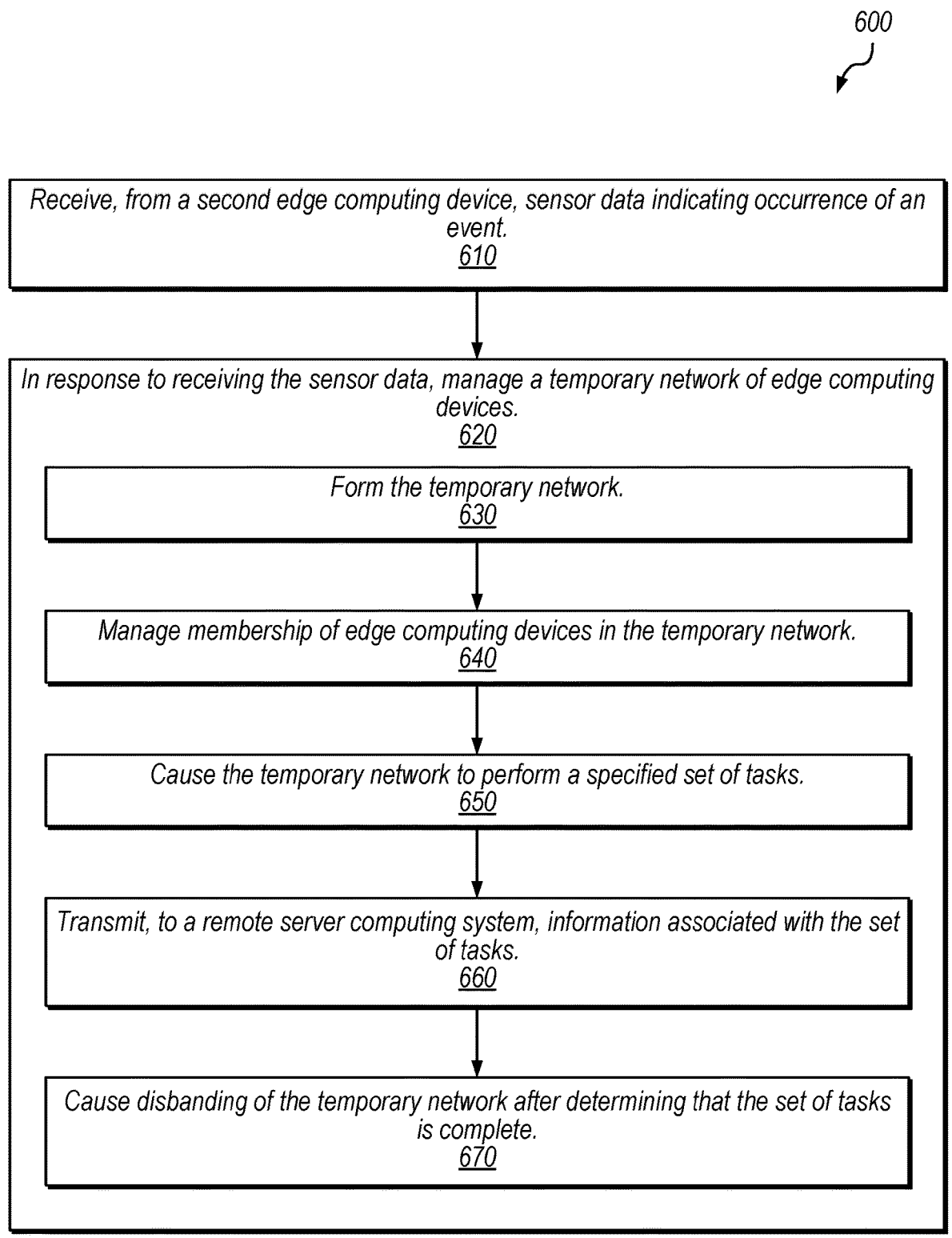
FIG. 6 is a flow diagram illustrating a method for managing a temporary network of edge computing devices based on sensor data, according to some embodiments.

FIG. 6 is a flow diagram illustrating a method for managing a temporary network of edge computing devices based on sensor data, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 600 may be performed by an edge computing device 130, for example.

At 610, in the illustrated embodiment, a first edge computing device receives from a second edge computing device, sensor data indicating occurrence of an event. For example, the first edge computing device might be a camera that captures the occurrence of the event and sends a notification to the second computing device, which is a cleaning device. In this example, the camera is a manager device.

At 620, the first edge computing device manages, in response to receiving the sensor data, a temporary network of edge computing devices. In some embodiments, the managing is performed based on a set of engagement rules that are downloaded by one or more edge computing devices from the remote server computing system prior to the occurrence of the event, where the set of engagement rules specify guidelines for forming and disbanding temporary networks.

At 630, the first edge computing device forms the temporary network. For example, the first edge computing device may connect with the second edge computing device and one or more other edge computing devices.

At 640, the first edge computing device manages membership of edge computing devices in the temporary network. In some embodiments, the managing is performed based on a set of execution rules, where the set of execution rules are downloaded, by the edge computing device managing the temporary network from the remote server computing system, in response to the occurrence of the event. In some embodiments, the set of execution rules are determined by the remote server computing system based on metadata associated with the temporary network.

At 650, the first edge computing device causes the temporary network to perform a specified set of tasks. In some embodiments, the set of tasks is specified by the remote server computing system based on output of a trained machine learning model.

At 660, the first edge computing device transmits, to a remote server computing system, information associated with the set of tasks. For example, the first edge computing device may send a notification to the remote server indicating that the set of tasks has been complete.

At 670, the first edge computing device causes disbanding of the temporary network after determining that the set of tasks is complete. In some embodiments, the first edge computing device causes disbanding of the temporary network based on receiving an instruction from the remote server computing system to disband.

Example Computing Device

Figure 7:
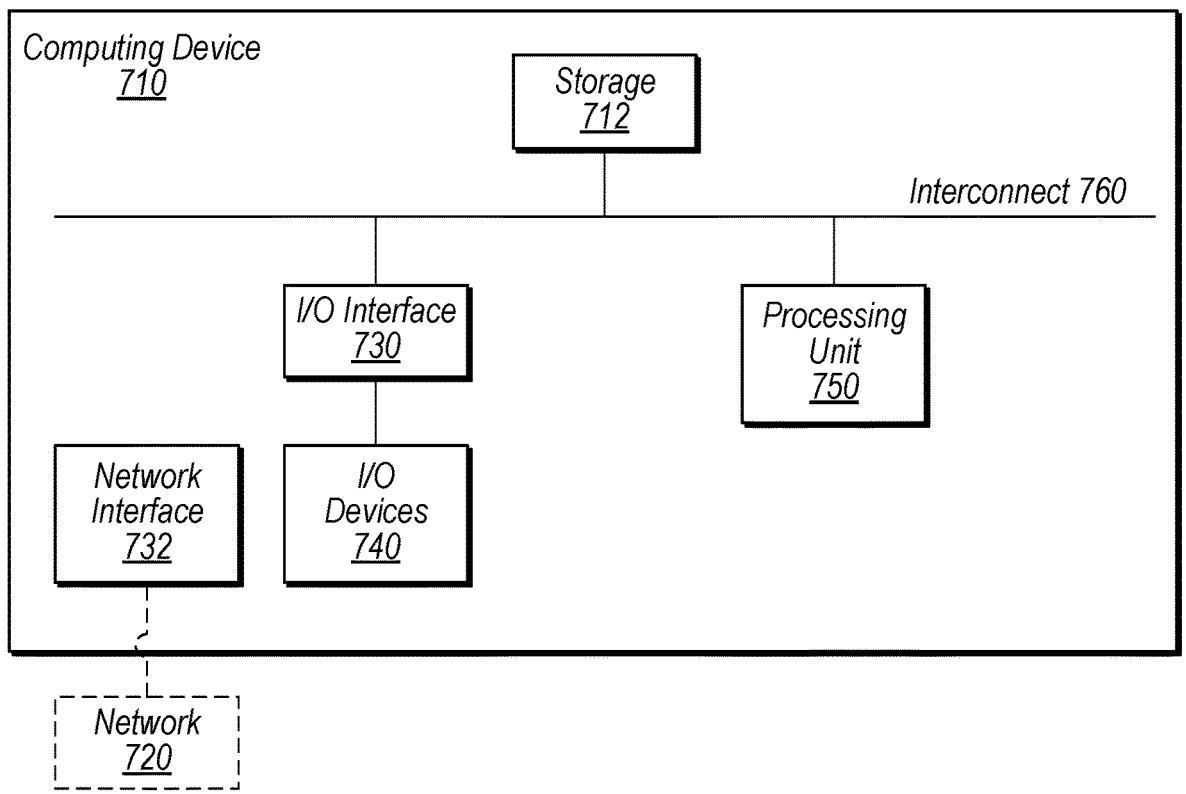
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be one of edge computing devices 130, which in turn may be any suitable type of device, including, but not limited to, a personal computer system, desktop computer, laptop or notebook computer, mainframe computer system, web server, workstation, or network computer (e.g., remote server computing system 110). As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A non-transitory computer-readable medium having instructions stored thereon that are capable of causing a first edge computing device to implement operations comprising:
in response to occurrence of an event, managing a temporary network of edge computing devices, wherein the managing includes:
forming the temporary network;
managing membership of edge computing devices in the temporary network;
causing the temporary network to perform a specified set of tasks;
transmitting, to a remote server computing system, information associated with the specified set of tasks; and
after determining that the specified set of tasks is complete, causing disbanding of the temporary network;
wherein the first edge computing device is located in a first geographic region, wherein a second edge computing device that is located in a second, different geographic region is added to the temporary network, and wherein in response to being added to the temporary network, the second edge computing device relocates to the first geographic region.

2. The non-transitory computer-readable medium of claim 1, wherein the first edge computing device is a manager device of the temporary network, and wherein the operations further comprise:
receiving, prior to the managing, an indication of the occurrence of the event from another edge computing device.

3. The non-transitory computer-readable medium of claim 1, wherein the set of tasks is specified by the first edge computing device implementing the managing based on evaluating the event and available edge computing devices using a trained machine learning model.

4. The non-transitory computer-readable medium of claim 1, wherein the managing is performed based on a set of engagement rules that are downloaded by one or more edge computing devices from the remote server computing system prior to the occurrence of the event.

5. The non-transitory computer-readable medium of claim 4, wherein the set of engagement rules specifies guidelines for forming and disbanding temporary networks.

6. The non-transitory computer-readable medium of claim 1, wherein the managing is performed based on a set of execution rules, wherein the set of execution rules are downloaded, by the first edge computing device managing the temporary network from the remote server computing system, in response to the occurrence of the event, and wherein the set of execution rules are determined by the remote server computing system based on metadata associated with the temporary network.

7. The non-transitory computer-readable medium of claim 6, wherein the set of execution rules includes one or more of the following rules: data access privileges for one or more edge computing devices, tasks executable by respective types of edge computing devices, and time requirements for responding to the event.

8. The non-transitory computer-readable medium of claim 1, wherein the information associated with the set of tasks specifies one or more of the following tasks: a type of event that has occurred, an indication that the temporary network has been formed, a number of devices included in the temporary network, an indication that the temporary network has been disbanded, and one or more types of devices included in the temporary network.

9. The non-transitory computer-readable medium of claim 1, wherein edge computing devices included in the temporary network are connected in a full mesh configuration.

10. A method, comprising:
receiving, by a first edge computing device from a second edge computing device, sensor data indicating occurrence of an event;
in response to receiving the sensor data, managing, by the first edge computing device, a temporary network of edge computing devices, wherein the managing includes:
forming the temporary network;
managing membership of edge computing devices in the temporary network;
causing the temporary network to perform a specified set of tasks;
transmitting, to a remote server computing system, information associated with the set of tasks; and
after determining that the set of tasks is complete, causing disbanding of the temporary network;
wherein the first edge computing device is located in a first geographic region, wherein the second edge computing device that is located in a second, different geographic region is added to the temporary network, and wherein in response to being added to the temporary network, the second edge computing device relocates to the first geographic region.

11. The method of claim 10, wherein the second edge computing device is a camera, and wherein the first edge computing device adds the camera to the temporary network in response to receiving the sensor data.

12. The method of claim 10, wherein the information associated with the set of tasks specifies one or more of the following tasks: a type of event that has occurred, an indication that the temporary network has been formed, a number of devices included in the temporary network, one or more types of devices included in the temporary network, one or more tasks completed by edge computing devices included in the temporary network, and an indication that the temporary network has been disbanded.

13. The method of claim 10, wherein edge computing devices included in the temporary network are connected in a partial mesh configuration.

14. The method of claim 10, wherein edge computing devices included in the temporary network communicate via one or more connections of the following types of network connections: Wi-Fi, BLUETOOTH, ZIGBEE, and a cellular network.

15. The method of claim 10, wherein the managing is performed based on a set of engagement rules that are downloaded by one or more edge computing devices from the remote server computing system prior to the occurrence of the event, and wherein the set of engagement rules specifies guidelines for forming and disbanding temporary networks.

16. A method, comprising:
collecting, by a first edge computing device, sensor data within a wireless network;
determining, by the first edge computing device based on the sensor data, occurrence of an event;
in response to the occurrence of the event, managing, by the first edge computing device, a temporary network of edge computing devices, wherein the managing includes:
forming the temporary network;
managing membership of edge computing devices in the temporary network;
causing the temporary network to perform a specified set of tasks;
transmitting, to a remote server computing system, information associated with the set of tasks; and
after determining that the set of tasks is complete, causing disbanding of the temporary network;
wherein the first edge computing device is located in a first geographic region, wherein a second edge computing device that is located in a second, different geographic region is added to the temporary network, and wherein in response to being added to the temporary network, the second edge computing device relocates to the first geographic region.

17. The method of claim 16, wherein the set of tasks is specified by the remote server computing system based on output of a trained machine learning model.

18. The method of claim 16, wherein the managing is performed based on a set of engagement rules that are downloaded by one or more edge computing devices from the remote server computing system prior to the occurrence of the event.

19. The method of claim 16, wherein the managing is performed based on a set of execution rules, and wherein the set of execution rules are downloaded, by the edge computing device managing the temporary network from the remote server computing system, in response to the occurrence of the event, and wherein the set of execution rules are determined by the remote server computing system based on metadata associated with the temporary network.

20. The method of claim 19, wherein the set of execution rules includes one or more of the following rules: data access privileges for one or more edge computing devices, tasks executable by respective types of edge computing devices, and time requirements for responding to the event.

* * * * *